United States Patent
Brandl et al.

(10) Patent No.: US 7,784,807 B2
(45) Date of Patent: Aug. 31, 2010

(54) WHEEL SUSPENSION FOR MOTOR VEHICLES

(75) Inventors: Hans-Jurgen Brandl, Weichering (DE); Jaromir Kur, Ingolstadt (DE)

(73) Assignee: Audi AG, Ingolstadt (DE)

( * ) Notice: Subject to any disclaimer, the term of this patent is extended or adjusted under 35 U.S.C. 154(b) by 756 days.

(21) Appl. No.: 10/544,626

(22) PCT Filed: Nov. 28, 2003

(86) PCT No.: PCT/EP03/13447

§ 371 (c)(1),
(2), (4) Date: Mar. 3, 2008

(87) PCT Pub. No.: WO2004/069567

PCT Pub. Date: Aug. 19, 2004

(65) Prior Publication Data

US 2009/0218783 A1    Sep. 3, 2009

(30) Foreign Application Priority Data

Feb. 5, 2003    (DE) ............................ 103 04 567

(51) Int. Cl.
*B60G 3/18* (2006.01)

(52) U.S. Cl. ............................. 280/124.135

(58) Field of Classification Search .......... 280/124.135, 280/124.136, 124.137, 124.14
See application file for complete search history.

(56) References Cited

U.S. PATENT DOCUMENTS

| 4,744,586 A | 5/1988 | Shibahata et al. |
| 5,499,839 A | 3/1996 | Wahl et al. |
| 6,311,962 B1 | 11/2001 | Marking |

FOREIGN PATENT DOCUMENTS

| DE | 2818198 | 2/1981 |
| DE | 4022613 | 1/1992 |
| DE | 4101369 | 7/1992 |
| DE | 10045956 | 3/2002 |
| EP | 0312425 | 4/1989 |
| FR | 2730956 | 8/1996 |

*Primary Examiner*—Faye M. Fleming
(74) *Attorney, Agent, or Firm*—Novak Druce + Quigg

(57) ABSTRACT

The invention relates to a suspension for the wheels of an axle of a motor vehicle, especially for the steered front wheels. Said wheel suspension comprises wheel carriers that rotatably bear the wheels and are arranged so as to create straight-line steering via several individual links which are pivotally connected to the motor vehicle body and one respective track rod. Resilient means which directly or indirectly impress a certain prestress that acts around the spread axle of the wheels and in the opposite direction are provided in the wheel suspension in order to improve steering return and steering precision.

15 Claims, 2 Drawing Sheets

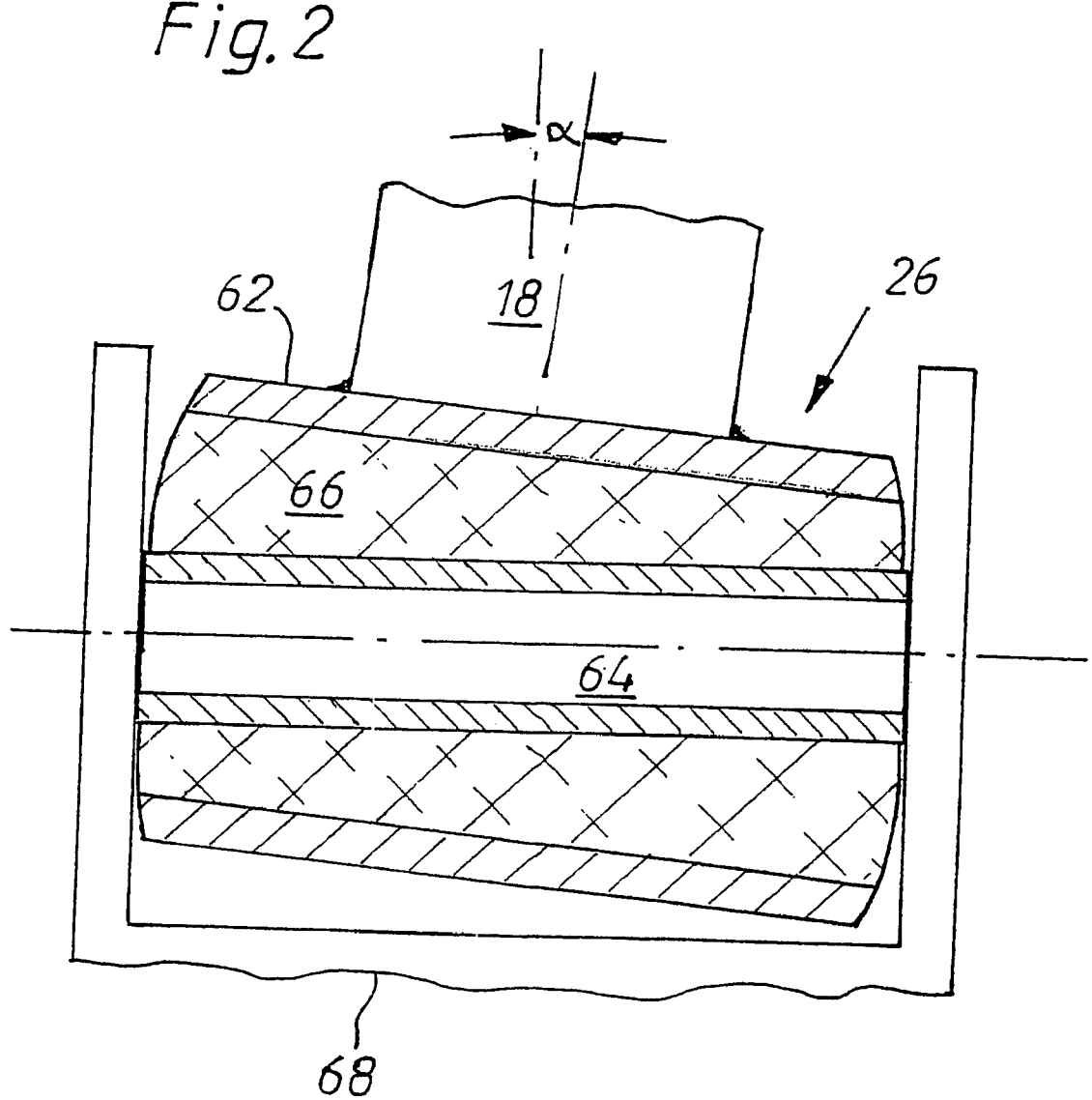

WHEEL SUSPENSION FOR MOTOR VEHICLES

This application is a §371 application of PCT/EP2003/013447, which claims priority from DE 10304567.8, filed Feb. 5, 2003.

BACKGROUND

This invention relates to a wheel suspension for the wheels of an axle of a motor vehicle, especially for the steered front wheels.

The steering return motion for front wheel suspensions of motor vehicles (front axle) and the joint loads for rear wheel suspensions (rear axle) among other factors are determined by the kinematic design of the wheel suspensions. Thus for example for the front axles the tilt of the steering axis or expansion axis determines the roll radius, the caster, and for the driven wheels the so-called quantity a, the disturbing force lever arm for the driving forces in the wheel center. If these parameters are to be kept small to prevent disturbing forces when the vehicle is driving in a straight line, under lateral forces, and when accelerating, the indicated parameters must be defined accordingly. This applies especially in wheel suspensions with so-called released links or multilink axles, in which the expansion axis can be virtually defined by the corresponding three-dimensional orientation of the individual links. But the reduction of the aforementioned disturbing forces is also accompanied by a reduction of the steering return motion or reduced kinematic prestress of the wheel suspension parts.

SUMMARY OF THE INVENTION

The object of the invention is to devise a wheel suspension of the generic type in which further improved stabilization and optionally steering return motion can be produced by relatively simple means while maintaining low disturbing forces while driving.

It is proposed that elastically resilient means be provided in the wheel suspension which directly or indirectly apply to the wheel carriers prestress which acts around the expansion axis of the wheels in opposite directions. Thus, regardless of the kinematic design of the wheel suspension, prestress which is generated similarly to a large spread angle of the expansion axis is produced in the wheel suspension and track rods and improves the response behavior and/or steering the vehicle in a straight line and can eliminate minor joint play which may be present. This applies both to the steered wheels of the motor vehicle and also for multilink wheel suspensions to unsteered wheels in which one of the individual links is designed similarly to a track rod to achieve a defined resonant intrinsic steering behavior of the wheel suspension.

It is further proposed that the spring means prestress the wheels of the motor vehicle in the direction of the toe-in. This is especially advantageous for the driven wheels of the motor vehicle, although depending on the kinematic design of the wheel suspension the opposite prestress may also be appropriate.

The means can act additionally to damp vibrations, by which advantageously a double function can be achieved, in which vibration excitation in the wheel suspensions can be increasingly suppressed.

The elastically resilient means can be metallic springs such as helical springs, leg springs, leaf springs, etc., or rubber-elastic springs. But preferably it is suggested that the means are hydropneumatic gas springs which are each configured asymmetrically to the expansion axis between the body of the motor vehicle and a wheel suspension part. Such telescoping gas springs can be structurally configured in a favorable manner and work reliably. With respect to the coupling to the body of the motor vehicle this can be an auxiliary frame which is connected to the body or can be the body directly, and optionally an already present coupling point can be used at the same time for example for one of the links of the wheel suspension.

The gas springs can be coupled in a structurally favorable manner directly to the wheel carriers. Here likewise already existing attachment points such as for example the calipers of the hydraulic service brakes of a motor vehicle can optionally be used. Moreover, the indicated prestress forces can be applied especially effectively to the wheel suspension, especially when gas springs act on the wheel carrier behind the expansion axis for track rods which likewise are attached behind the indicated expansion axis of the wheels in the direction of travel.

One structurally advantageous configuration of the gas springs arises when the latter, viewed in the direction of travel, extend in the shape of an arrow obliquely to the longitudinal center axis of the motor vehicle, the body-side coupling point being located in front of the indicated expansion axis of the wheels. In this way it is relatively easy to configure the gas springs past the existing individual links according to the required geometry.

For a front axle with steered wheels driven by way of drive shafts, the gas springs can be positioned above the lower links and underneath the drive shafts.

In addition or as an alternative, the spring means can be formed by at least one rubber-elastic link bearing each which is elastically prestressed in the installation position. As a result of the detached link configuration the required prestress in the wheel suspension and torsional stress around the expansion axis can be produced with the cited advantages.

On the basis of commercial rubber-metal sleeve bearings which are generally used in link bearings, said rubber-metal sleeve bearings can be prestressed by suitable interleaving in the installation position. In order not to adversely affect the characteristics of the sleeve bearings, it can however prove to be necessary to design them asymmetrically such that for the bearing areas of the rubber sleeves subject to compression there are thickened areas, in cross section similar to cam contours.

Preferably there are elastically prestressed link bearings for track rods located in the upper link plane of the wheel suspension on the upper links. As a result of direct application of the prestress forces to the track rods of the steering of the motor vehicle this also effects even higher steering precision.

Finally, the elastically prestressed link bearings can be located in an especially structurally with highly favorable results on the body-side coupling points of the links.

BRIEF DESCRIPTION OF THE DRAWINGS

Two embodiments of the invention will be described in greater detail below, in which in diagrammatic form FIG. 2 presents a body-side link bearing in a longitudinal section, used in a modified form to achieve inner prestress in the wheel suspension as shown in FIG. 1.

DETAILED DESCRIPTION OF THE INVENTION

Figure 1:
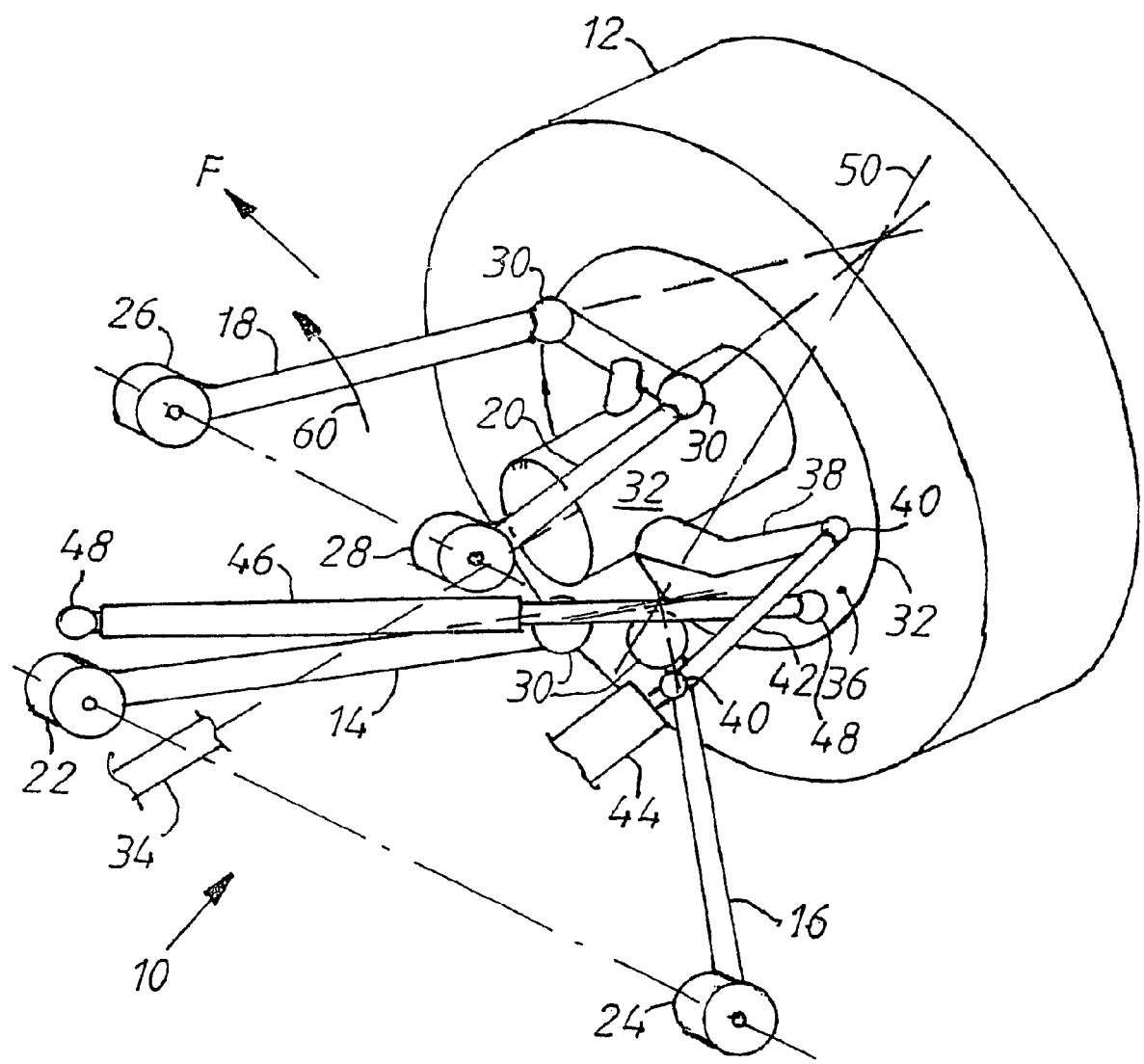
FIG. 1 presents a wheel suspension for the steered wheels of a front axle for motor vehicles, with a gas spring which is configured between the body and the wheel carrier.

In FIG. 1 the right front wheel suspension for the steered wheels 12 of a motor vehicle which is not shown is designated as 10. The left front wheel suspension can be imagined as the identical mirror image. Let it be noted that the wheel suspension 10 is described only to the extent that this is necessary for an understanding of this invention. For example, the stabilizer, the bearing springs and the telescoping shock absorbers or a similar spring element are not shown. The direction of travel of the motor vehicle is identified by the arrow F.

The wheel suspension 10 in the lower link plane has two (individual) links 14, 16 which are analogously configured with regard to their three-dimensional area and two other (individual) links 18, 20 in the upper link plane.

The indicated links 14 to 20 are pivot-connected to the body (not shown) of the motor vehicle by way of rubber-metal sleeve joints 22, 24, 26, 28. The body can be a frame structure or an auxiliary frame connected to the body.

Furthermore, the links 14 to 20 are pin-jointed by way of ball joints (uniformly designated as 30) to the guiding wheel carrier 32 which pivotally supports the wheel 12.

A drive shaft 34 which is shown only in a segment drives the wheel 12 of the front-wheel or all-wheel drive motor vehicle. The caliper of the disk brake of the service brakes of the motor vehicle is mounted on the wheel carriers 32 at 36 in the conventional manner which is not shown.

A steering link 38 projects up tilted at an angle from the wheel carrier 32 opposite the direction of travel F and is drive-connected by way of ball joints 40 to the rack-and-pinion steering 44 which is only suggested on a track rod 42 which extends more or less in the transverse direction in the upper link plane.

With reference to the left wheel suspension which is not shown, to the front on the wheel suspensions 10 in the shape of an arrow there is a gas spring 46 each which acts to damp vibrations in an elastically resilient manner. The gas spring 46 can be of hydropneumatic design, as are conventional for example in supporting shock absorbers of motor vehicles or for hatch actuations.

The gas springs 46 are coupled on the one hand to the body (or auxiliary frame) of the motor vehicle and on the other hand at 36 in the area of the caliper by way of ball joints 48.

The respective gas springs 46 extend from the lower front link bearing 22 of the link 14 obliquely to the longitudinal axis of the motor vehicle and against the direction of travel F above the link plane formed by the lower links 14, 16, but underneath the drive shaft 34 to the wheel carrier 32. The corresponding ball joint 48 can be fixed uniformly on the mount for the caliper at 36.

Viewed from overhead, the body-side coupling point 48 of the gas springs 46 lies in front of the steering axis or expansion axis 50 of the wheel suspension 10, which axle is shown by the broken line, while, as is clearly apparent, the wheel carrier-side coupling point 48 (at 36) lies clearly behind expansion axis 50 which extends essentially in the vertical direction. For the sake of form it should be mentioned that the indicated expansion axis 50, as is recognized, intersects the intersection points of the imaginary extensions of the straight connecting lines of the links 14, 16 and 18, 20 and thus forms the virtual steering axis of the motor vehicle in order to turn the steered wheels 12 during steering movements.

The prestress forces applied by the gas springs 46 (which of course must be of the same strength when driving in a straight line) impart to the wheel carriers 12 a torque around the expansion axis 50 in the direction of toe-in of the wheels 12. Based on the described configuration these prestress forces as an internal force cancel out one another and are supported by way of the track rods 42 and rack-and-pinion steering 44.

Regardless of the aforementioned, this prestress causes compensation of play in the described ball joints 32 and 40, and conjunction with that, improved response sensitivity and steering precision.

Furthermore, improved steering return motion to straight-line driving is achieved because the gas springs 46 which telescopically retract at the maximum steering angle (for example in a right-hand curve the illustrated right-hand gas spring 46) exerts a higher prestress force than the opposite, telescopically extended gas spring 46.

Finally, the gas springs 46 which have a conventional hydraulic damping means effect additional vibration damping in the wheel suspensions 10 so that such a wheel suspension runs more smoothly and experiences fewer disruptive effects from the roadway and/or rotating masses.

As an alternative or in addition, the spring means can also be link bearings 22 to 28 which are accordingly prestressed in the installation position and which are configured and/or installed such that they exert at least indirectly a prestress around the expansion axis 50, as described above.

This prestress is show in FIG. 1 using the upper, front link 18 with the arrow 60.

The corresponding link bearing 26 is shown by FIG. 2. The link bearing is a rubber-metal sleeve bearing of conventional design.

It has an outer link eye 62 which is welded fast to the link 18, an inner metal sleeve 64 and an annular rubber bushing 66 which lies in between.

The link bearing 26 is inserted into a body-side bracket 68 which is shown only partially and its inner metal sleeve 64 is attached to the bracket 68 by means of a through screw (not shown).

Deviating from the prior art, the link eye 62 is welded on a slant to the link 18 offset by an angle $\alpha$ such that in the installation position of the link 18 (defined by the three-dimensional configuration of the links 18 to 24 and the track rod 42) it causes tilting or interleaving with the slant shown in FIG. 2 or asymmetrical deformation of the rubber bushing 66. So that when driving no unwanted friction can occur between the bracket 68 and the link bearing 26, the faces of the rubber bushing 66 and especially of the link eye 62 are made crowned, as is apparent.

The described interleaving of the link bearings 26 produces a torque according to arrow 60 in FIG. 1 on the links 18 (looking at the two wheel suspensions 10) or indirectly on the wheel carrier 32 which is supported in turn by way of the track rods 42 and the rack-and-pinion steering 44 as an internal force. This bracing in turn produces the prestress which acts around the expansion axis 50 on the described ball joints 30 and 40.

The invention is not limited to the described embodiments. Thus, the spring means for exerting the described prestress can also be metal springs such as helical springs, leg springs, leaf springs, etc. Furthermore the illustrated gas springs 46, to the extent this can be structurally represented, can also be located transversely to the direction of travel F of the motor vehicle or in another orientation.

Instead of one link bearing 26, several link bearings 22 to 28 accordingly can also be used prestressed. It can be regarded as essential to the invention that the spring means do not apply any pure reset forces to the steering of the motor vehicle (for example, within the steering gear), but keep the described joints 30, 40 prestressed as an internal force.

Instead of the described offset (angle $\alpha$) of the link eye 62 to the link 18 (symmetrical construction of the link bearing 26) the metal sleeve 64 can also be offset relative to the link eye 62 (asymmetrical construction).

The wheel suspension 10 can also be provided only in one link plane, that is to say, at the top or bottom, with released (individual) links. Furthermore, instead of a wheel suspension 10 with steered wheels, a rear wheel suspension with wheels of the wheel suspension which have only defined resonant intrinsic steering can also be provided with the described features. The track rods are likewise coupled to the body or auxiliary frame of the motor vehicle in this wheel suspension without a steering gear connected in between.

The invention claimed is:

1. Wheel suspension for the wheels of an axle of a motor vehicle comprising wheel carriers which rotatably bear the wheels and which are configured by way of several individual links which are coupled to the body of the motor vehicle and one track rod each for creating straight-line steering, wherein elastically resilient means in the wheel suspension which apply to the wheel carriers prestress which acts around the expansion axis of the wheels in opposite directions wherein the means are hydropneumatic gas springs which are each located between the body of the motor vehicle and a wheel suspension part asymmetrically to the expansion axis, wherein the gas springs extend obliquely to the longitudinal axis of the vehicle and wherein the body-side coupling point lies in front of the indicated expansion axis of the wheels.

2. The wheel suspension as claimed in claim 1, wherein the spring means prestress the wheels of the motor vehicle in the direction of toe-in or toe-out.

3. The wheel suspension as claimed in claim 1 wherein the means additionally act to damp vibrations.

4. The wheel suspension as claimed in claim 1, wherein the gas springs are coupled directly to the wheel carriers.

5. The wheel suspension as claimed in claim 1, wherein the gas springs act on the wheel carrier behind the expansion axis for track rods which likewise lie behind the indicated expansion axis of the wheels in the direction of travel.

6. The wheel suspension as claimed in claim 1, wherein for a front axle with steered wheels driven by way of drive shafts gas-filled shock absorbers are positioned above lower links and underneath the drive shafts.

7. Wheel suspension for the wheels of an axle of a motor vehicle comprising wheel carriers which rotatably bear the wheels and which are configured by way of several individual links which are coupled to the body of the motor vehicle and one track rod each for creating straight-line steering, wherein elastically resilient means in the wheel suspension which apply to the wheel carriers prestress which acts around the expansion axis of the wheels in opposite directions wherein the elastically resilient means are formed by at least one rubber-elastic link bearing each which is elastically prestressed in the installation position.

8. Wheel suspension for the wheels of an axle of a motor vehicle comprising wheel carriers which rotatably bear the wheels and which are configured by way of several individual links which are coupled to the body of the motor vehicle and one track rod each for creating straight-line steering, wherein elastically resilient means in the wheel suspension which apply to the wheel carriers prestress which acts around the expansion axis of the wheels in opposite directions wherein the elastically prestressed link bearings are correspondingly made rubber-metal sleeve bearings with symmetrical or asymmetrical configuration.

9. Wheel suspension as claimed in claim 1, wherein there are elastically prestressed link bearings on at least one upper link for the track rods which are located in the upper link plane of the wheel suspension.

10. The wheel suspension as claimed in claim 7, wherein the elastically prestressed link bearings are located on the body-side coupling points of the links.

11. A wheel suspension system for a motor vehicle, comprising:
   a wheel carrier;
   at least one upper control rod operatively interconnecting said wheel carrier and a body of said vehicle; and
   at least one lower control rod operatively interconnecting said wheel carrier and said body;
   wherein at least one connection of one of said control rods with one of said wheel carrier and said body includes a first rigid member connected to said body provided with a first axis, a second rigid member connected to said one control rod provided with an axis angularly displaced relative to said axis and a resilient member interposed between said first and second rigid members.

12. A wheel suspension system according to claim 11 wherein said first. and second rigid members are cylindrically configured.

13. A wheel suspension system according to claim 12 wherein a longitudinal centerline of said one control rod is disposed perpendicularly to the axis of one of said rigid cylindrical members.

14. A wheel suspension system according to claim 11 including a link interconnecting said body at a point on a first side of the pivot axis of said wheel carrier and said wheel carrier at a point on a second side of said pivot axis, including first and second rigid sections having a compressible biasing medium therebetween.

15. A wheel suspension system according to claim 14 wherein said rigid sections are telescopically interconnected.

* * * * *